United States Patent [19]

Leyder

[11] Patent Number: 5,135,341
[45] Date of Patent: Aug. 4, 1992

[54] DEVICE FOR FASTENING AN ELECTRONIC EQUIPMENT TO A MOUNTING WALL

[75] Inventor: Klaus Leyder, Hildesheim, Fed. Rep. of Germany

[73] Assignee: Blaupunkt-Werke GmbH, Hildesheim, Fed. Rep. of Germany

[21] Appl. No.: 784,700

[22] Filed: Oct. 30, 1991

[30] Foreign Application Priority Data

Nov. 17, 1990 [DE] Fed. Rep. of Germany ....... 4036677

[51] Int. Cl.⁵ ..................... F16B 19/00; F16B 37/04
[52] U.S. Cl. ................................. 411/182; 411/55; 411/508; 411/913; 403/406.1; 403/408.1
[58] Field of Search ............ 411/55, 60, 182, 508–510, 411/908, 913; 403/406.1, 408.1

[56] References Cited

U.S. PATENT DOCUMENTS

| | | | |
|---|---|---|---|
| 1,978,935 | 10/1934 | Douglas | 411/913 X |
| 4,449,877 | 5/1984 | Kessler | 411/182 X |
| 4,760,495 | 7/1988 | Till | 411/182 X |
| 4,906,152 | 3/1990 | Kurihara | 411/913 X |
| 5,065,490 | 11/1991 | Wivagg et al. | 411/182 X |

FOREIGN PATENT DOCUMENTS

2903176 12/1983 Fed. Rep. of Germany.
8626192.4 2/1988 Fed. Rep. of Germany.
707819 4/1954 United Kingdom ................ 411/182

Primary Examiner—Neill R. Wilson
Attorney, Agent, or Firm—Frishauf, Holtz, Goodman & Woodward

[57] ABSTRACT

On the rear side of the front panel (1) of an electronic equipment, at each lateral end which overlaps an edge of an aperture (3) into which the electronic equipment is being inserted, bushings (5) having rearwardly extending catch members (6) are fastened to the rear of the front panel by screws (12). The bushings are of resilient synthetic plastic. The catch members are disposed around a continuation of the central bore of the bushing. Stepped bores (14) are provided in the wall portion overlapped by the front panel. When the bushings are inserted into these stepped bores the catch members are first deflected inwards and then, as they reach their final position, spring outwards and catch against the step (16) of the bore (14). Mating projections (9) and openings (10) lock each bushing against rotation as it is screwed on to the front panel (1). Between the catch prongs there are sector cavities (13) for accepting a mating projection in the bore through the wall (2), so as to hold the bushing against rotation when the front panel is removed for repair or replacement after releasing the screws (12). As a result the bushings will be in correct position or refastening the front panel.

2 Claims, 1 Drawing Sheet

DEVICE FOR FASTENING AN ELECTRONIC EQUIPMENT TO A MOUNTING WALL

This invention concerns devices for fastening electronic equipment to a wall or partition in which resilient catch members of a fastener are latched. Such fastening is typically performed in the installation of the equipment in an opening in the wall or structure. After insertion of equipment in the opening the catch members are caused to spring out and grasp behind edges provided in holes into which the catch members are inserted.

BACKGROUND AND PRIOR ART

For installing an auto radio that is intended to be built into a motor vehicle, rapid fastening of the radio in the vehicle is often required which permits the fastening of the auto radio into its place with few hand motions.

It is known from German Pat. No. 29 03 176 to equip a device to be installed, particularly an automobile radio, with spring catch devices, preferably disposed laterally, by means of which the equipment, when inserted into a receiving frame previously mounted in the motor vehicle, is automatically snapped into place and held fast. The removal of the equipment is performed with a pencil-shaped tool, with which the catch devices are released through four openings in the front side of the equipment, after which the equipment is pulled out.

SUMMARY OF THE INVENTION

It is an object of the present invention to provide a fastening device for an auto radio which permits rapid installation and nevertheless has no openings in the front panel of the radio necessary for the passage of release tools.

Briefly, the front panel of the equipment is provided on its rear side with bushings directed rearward made of a resilient synthetic resin (so-called plastic) by screws which are tightened from the front. A stepped bore is provided in the mounting wall for every bushing, constructed in such a manner that when the bushing, already fastened on the rear side of the front panel, is introduced into the stepped bore, the catch members provided with oblique surfaces engaging the bore will first be deflected inwards and when they reach their final position will spring out, whereby surfaces of the catch members perpendicular to the bushing axis will grasp behind the step of the bore provided as an opposing surface for the catch members.

The advantages of the invention ar mainly that the device consists of a few parts that are all economically producible, is easy to mount and easy to release, and requires no supplementary holding frames and no release openings in the front panel of the radio.

It is advantageous to provide a threaded bore in each of the bushings for a fastening screw and also cavities or projections which cooperate with projections or cavities on the rear side of the front panel to oppose rotation of a bushing out of position before the mounting procedure starts. Similarly cavities or projections of the bushings can cooperate with projections or cavities in the stepped bores of the wall on which the equipment is mounted for angular locking when the equipment is removed. A particularly convenient embodiment of the invention has bushing with four equal prongs separated by slot-like cavities extending to the threaded bore. The cavities provide a seat for a projection disposed in the bore of a wall on which the equipment is mounted for locking the bushing against turning on its axis.

BRIEF DESCRIPTION OF THE DRAWINGS

The invention is further described by way of illustrative example with, reference to the annexed drawings, in which.

DESCRIPTION OF THE ILLUSTRATED EMBODIMENTS

Figure 1:
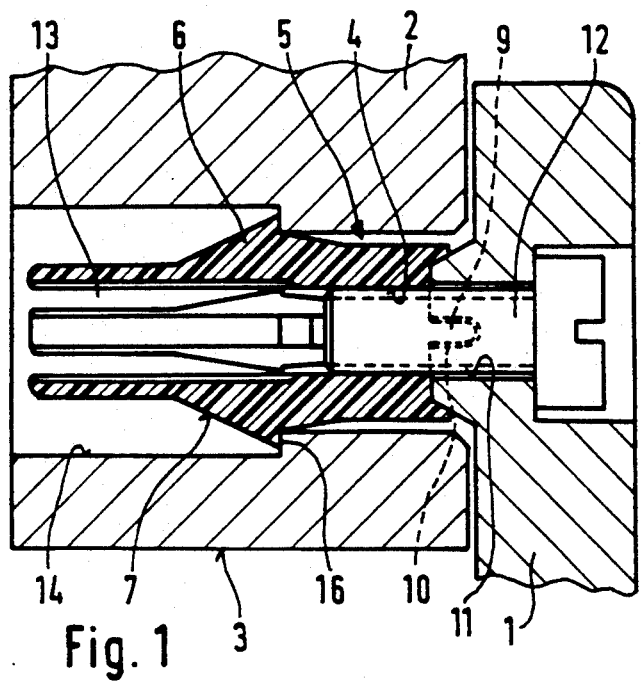
FIG. 1 is a cross section of a fastening device in accordance with the invention.

FIG. 1 shows in section, partly broken away, the front panel 1 of an electronic equipment which is not further illustrated in the drawings. The front panel 1 overlaps, with its outer portions at each lateral end, an edge portion of a cavity 3 into which the electronic equipment is to be inserted, this cavity being provided in a wall or panel 2, for example the dash board of an automobile.

Figure 3:
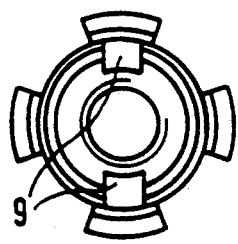
FIG. 3 is an end view of a bushing of a fastening device of the invention, which is provided with catch members.
Figure 4:
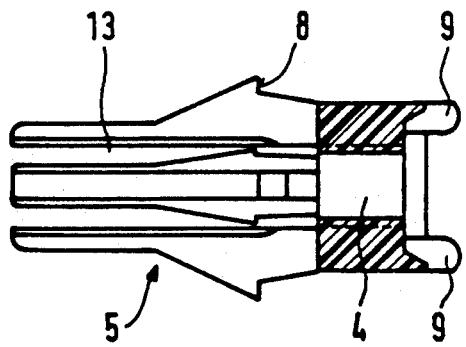
FIG. 4 is a side elevation, partly in section of the bushing of FIG. 3.
Figure 5:
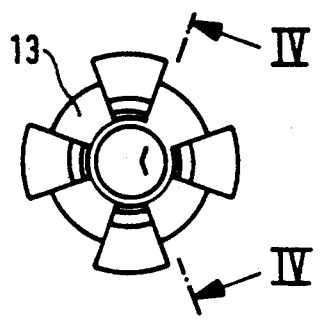
FIG. 5 is a rear end view of the bushing FIGS. 3 and 4 showing the planes in which the section portion of FIG. 4 is taken.

A bushing 5 made of a resilient synthetic material (plastic) is provided with a threaded bore 4 by which it is fastened to the front panel 1, by means of the screw 12 passing through a clearance bore 11. The bushing 5 is made with four catch members 6 distributed at equal distances around a rearward extension of the bore extending beyond the end of the threads for the screw 12. The catch members 6 have oblique surfaces 7 for facilitating their full passage through the narrower part of the bore 14 and they have catch surfaces 8 (see FIG. 4) which are perpendicular to the axis of the bushing. At the end of the bushing facing the front panel 1 there are two projections 9 located diametrically opposite each other (see also FIG. 3) which correspond to and are seated in cut-outs 10 at the rear side of the front panel 1. Consequently the bushing 5 is held against turning on its axis when it is fastened to the front panel 1 by the screw 12 in preparation for later attachment of the front panel 1 to the wall 2.

Figure 2:
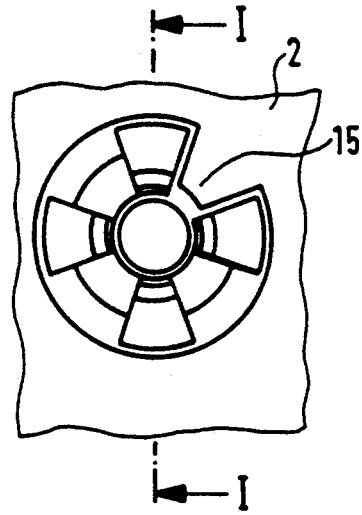
FIG. 2 is a rear view of a portion of the mounting wall to which a fastening device of the invention as shown in FIG. 1 has been inserted, showing the plane in which the cross section of FIG. 1 is taken.

At its end remote from the front panel 1, the bushing 5 is provided with four slot-shaped cut-outs 13 which extend all the way to the threaded bore 4. These cut-outs 13 are separated by four equally spaced catch members 6. A projection 15 (FIG. 2) in the wall of the bore 14 can fit into any one of the four slot cut-outs 13 when the bushing is inserted into the stepped bore 14, thus blocking the bushing against rotation relative to the wall 2. As already mentioned the bore 14 has a step 16 on the front side of which the bore 14 is narrower and the step 16 serves as a stop for the surfaces 8 of the catch members 6.

For fixing an electronic equipment into position, particularly an auto radio, on a wall structure having an opening for installation of the radio, the front panel 1 is first provided with two pre-mounted bushings 5, an operation that can be performed by machine. Then the equipment is inserted in the installation opening 3 of the wall structure 2. In this operation the catch members of a bushing are first pressed together by their insertion in the narrower front part of a stepped bore 14. When the final position of the bushing 5 is reached, the catch members 6 spring out and grasp the wall 2 behind the circumferential edge 16, so that the electronic equipment is fixed in place.

If it should be necessary or desirable to release and remove the electronic equipment, for example for reasons for repair or replacement, that can be done by simply unscrewing the screws 12. The bushings 5 are held against rotation in the bores 14 after the removal operation. A reinsertion of the electronic equipment can then take place by screwing in the screws 12, since the bushings 5 remain in the bores 14.

Although the invention has been described with reference to a particular illustrative example, it will be recognized that variations and modifications are possible within the inventive concept.

I claim:

1. A fastening device for attaching an electronic equipment having a front panel to portions of a wall adjacent to an aperture of said wall leading into a cavity for installation of said equipment, said front panel having front and rear sides and said device comprising:

a plurality of bushings (5) of resilient synthetic plastic respectively fastened releasably by screws (12) to said rear side of said front panel (1) at respective locations of said panel (1) spaced apart from each other so that said locations overlap respective wall portions adjacent to said aperture, said bushings (5) each having a bore for passage of a said screw (12) centered on an axis of the respective bushing, said screws (12) being accessible from the front side of said front panel (91) and said bushings (5) each having a plurality of rearwardly extending catch members (6) disposed around an open-ended extension of said bore (4) of said bushing and respectively having oblique surfaces (7) for facilitating rearward insertion and having forwardly facing catch surfaces (8) substantially perpendicular to said axis;

said bores (4) of said bushings for passage of said screws (12) being threaded bores, each said bushing, where it fits against said front panel when fastened thereto, having cavities or projections (9), or both cavities and projections, at locations situated around said bores and, at the rear side of said front panel, projections (10) or cavities, or both projections and cavities being provided, corresponding to said cavities or projections (9) or both cavities and projections of said bushings, for blocking rotation of said bushings when they are being fastened to or released from said front panel by said screws, and stepped bores (14, 16, 19) passing completely through said respective wall (2) portions and spaced from each other and dimensioned for accommodating insertion therein of said bushings (5) affixed to said front panel (1), each stepped bore having a wider rear portion, a narrower forward portion and a rearward-facing step surface (16) for engaging said catch surface (8) of catch members (7) of a said bushing when a said bushing is fully inserted into said stepped bore, whereby said catch members are permitted to spring outward in said wider rear portion of said stepped bore.

2. The fastening device of claim 1, wherein each said bushing has four equally spaced slot-shaped cavities (13) which extend from between end of said catch members (6) all the way to said threaded bore(4) for providing angular stops for a complementary inward projection (15) of the stepped bore, for prevention of turning of said bushing after release from said front panel by removal of said screws (12).

* * * * *